CHARLES A. OEHL.
Improvement in Machines for Rolling Lozenge and other Paste.
No. 114,468. Patented May 2, 1871.
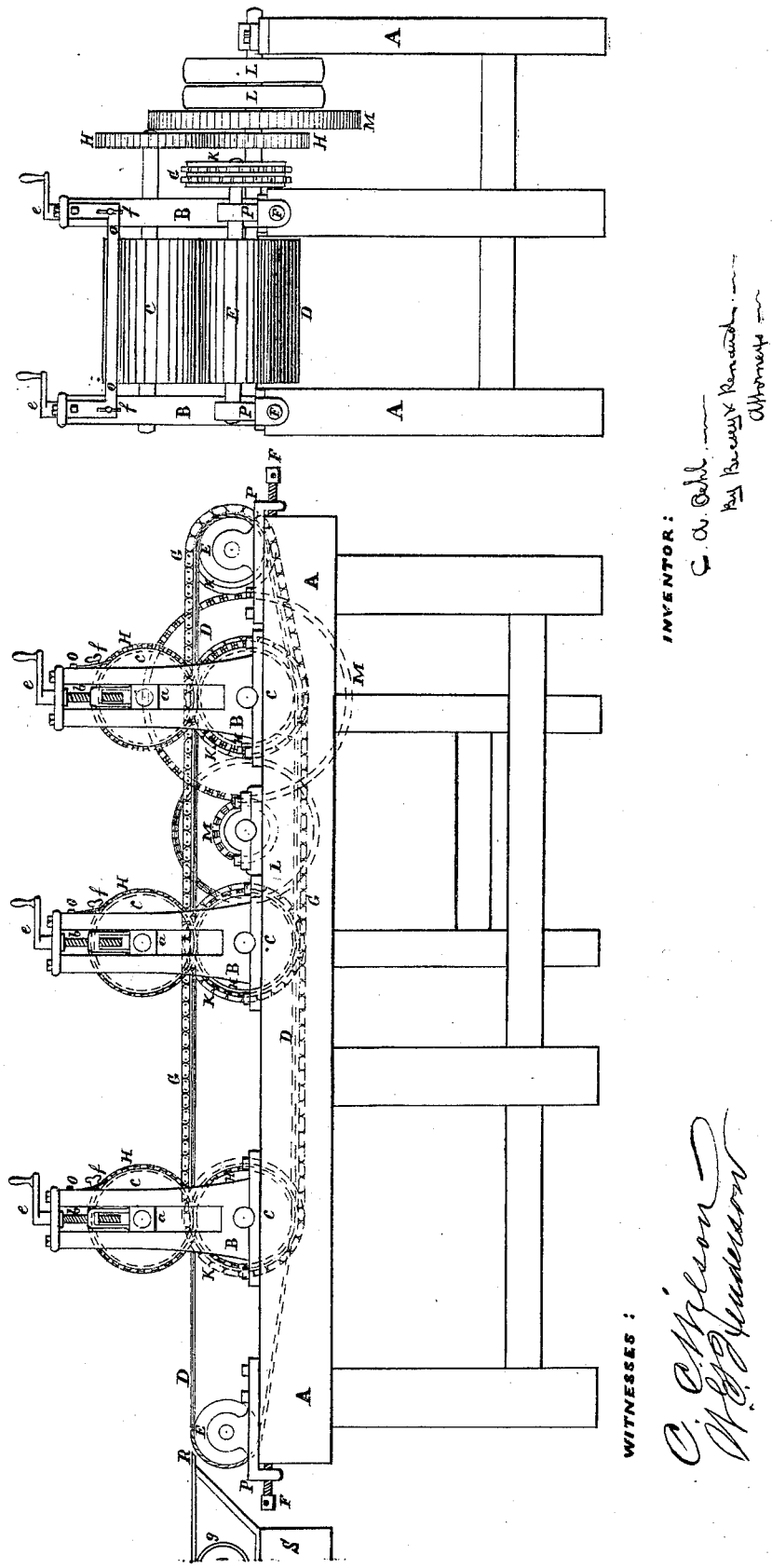

United States Patent Office.

CHARLES A. OEHL, OF NEW YORK, N. Y., ASSIGNOR TO ERNEST GREENFIELD AND PHILIP STRAUSS, OF SAME PLACE.

Letters Patent No. 114,468, dated May 2, 1871.

IMPROVEMENT IN MACHINES FOR ROLLING LOZENGE AND OTHER PASTES.

The Schedule referred to in these Letters Patent and making part of the same.

*To all whom it may concern:*

Be it known that I, CHARLES A. OEHL, of New York, in the county of New York and State of New York, have invented certain new and useful Improvements in Rolling-Machines; and I do hereby declare that the following is a full and exact description thereof, reference being had to the accompanying drawing making a part of this specification.

In the manufacture of lozenges, crackers, and other materials which are cut out from sheets of rolled plastic substances the process of manufacture is much retarded by the necessity of performing the rolling out of the sheets by hand labor. It is this slow and costly process which I design to abolish, by supplying a machine in which the rolling of the sheets and the feeding forward of the same to the cutting-machine will be rapidly and most effectually performed by automatic means, thereby vastly cheapening the whole process and increasing fifty-fold the rapidity with which it was originally performed.

As this machine is merely an improvement upon an adjunct to my former invention, reference is hereby made to it. (See Patent Lozenge-Cutter of C. A. OEHL, No. 99,937, dated February 15, 1870.)

My machine consists of a combination of devices, principally a series of adjustable rollers with simultaneous motion above and below an endless belt, for rolling out to any desired thickness the dough or paste, which is at the same time fed or carried forward to the cutting-machine.

Having thus described in general terms the nature of my invention, I will now proceed to explain it in detail, and show by what means manufacturers and others can use and operate the same.

Of the accompanying drawing—

Figure 1 is a side elevation.

Figure 2 is an end elevation or view.

By referring to the drawing it will be seen that—

A is a frame or table for holding the machinery *in situ.*

B B are standards which support the upper and lower sets of rollers C C, C C, the distance between the two sets being adjusted or graduated at pleasure by means of the sliding boxes *a a*, screws *b b*, and handles *c c*.

At D D is shown an endless belt passing between the two sets of rollers and carried forward, with the paste upon it, by the revolutions of the rollers to the point R, where the paste is taken up by the endless apron *g* of the cutting-machine where it passes under the printing-cylinder and rollers.

The end of the cutting-machine is shown at S, which is the point of attachment of the two.

At E E are shown rollers which are used in connection with screws F F and movable slide-bearings or clamps P P for tightening or slacking the endless belt D, and chain G; the latter serving with cog-wheels H H and chain-wheels K K, fig. 2, to connect rollers C C C C and give them simultaneous motion.

At L L, figs. 1 and 2, are shown four pulleys with cog-wheels at M M, which give the first motive power to the machine.

At O O are shown double-edged scrapers, which are adjusted by means of thumb-screws *b b*, and which serve to clean the rollers during their revolutions.

The perfect and harmonious operation of the various parts of this machine will be obvious to the most casual observer, and also their eminent fitness to secure the desired object.

The paste, passing along upon endless band D, is rolled out and carried forward by rollers C C C C, while said rollers are kept perfectly clean by the scrapers.

Furthermore, by means of the sliding boxes, screws, and handles (*a, b,* and *c*) different thicknesses may be given to the sheet of paste during its passage to the cutting-machine by means of the different adjustment of the upper and lower rollers.

I claim as new and desire to secure by Letters Patent—

1. The combination of both sets of rollers C C C C with endless belt D, sliding boxes *a a a a*, screws *b b b*, and handles *c c c*.

2. The combination of rollers E E, chain G, screws F F, and movable slide-bearings or clamps P P, connected with and operated by cog-wheels H H and chain-wheels K K, all substantially as set forth and described.

C. A. OEHL.

Witnesses:
 ERWIN I. SPINK,
 D. J. NEWLAND.